United States Patent [19]

Carlin

[11] 4,155,819
[45] May 22, 1979

[54] REMOVAL OF HEAVY METALS FROM BRINE

[75] Inventor: William W. Carlin, Portland, Tex.

[73] Assignee: PPG Industries, Inc., Pittsburgh, Pa.

[21] Appl. No.: 905,821

[22] Filed: May 15, 1978

Related U.S. Application Data

[63] Continuation of Ser. No. 829,410, Aug. 31, 1977.

[51] Int. Cl.² ............................ C25B 1/20; C25B 1/26
[52] U.S. Cl. .................................... 204/98; 204/128;
210/50; 210/52; 423/66
[58] Field of Search .................... 204/98, 128; 423/66;
210/52, 50

[56] References Cited

U.S. PATENT DOCUMENTS

| 2,114,576 | 4/1938 | Schinman | 210/11 |
|---|---|---|---|
| 2,790,707 | 4/1957 | Johnson | 23/184 |
| 2,982,608 | 5/1961 | Clemert | 23/89 |
| 3,067,133 | 12/1962 | Conley, Jr. et al. | 210/42 |
| 3,752,759 | 8/1973 | Burg et al. | 210/50 |

Primary Examiner—R. L. Andrews
Attorney, Agent, or Firm—Richard M. Goldman

[57] ABSTRACT

Disclosed is a method of electrolyzing alkali metal chloride brine. The method comprises feeding fortified brine to an electrolytic cell, passing an electrical current through the cell, and withdrawing depleted brine from the cell. Hydrochloric acid is added to the depleted brine to dechlorinate it; and the depleted, dechlorinated brine is then contacted with solid salt to refortify the brine. The solid brine is a source of heavy metal impurities. Sodium carbonate and barium carbonate are added to the refortified brine in order to precipitate calcium and sulfate ions therefrom. The precipitate is then separated from the refortified brine in order to obtain a refortified, purified brine. According to the disclosed method, ferrous ion and sufficient hydroxyl ion are added to the dechlorinated, depleted brine prior to its refortification in order to maintain the pH thereof above about 7 during fortification. After refortification, the pH is adjusted to pH 7 by the addition of hydrochloric acid and heavy metal impurities, such as vanadium, are flocculated therefrom. According to an alternate method, the pH can be adjusted to pH 2 by the addition of HCl and then to pH 7 by the addition of NaOH.

12 Claims, 1 Drawing Figure

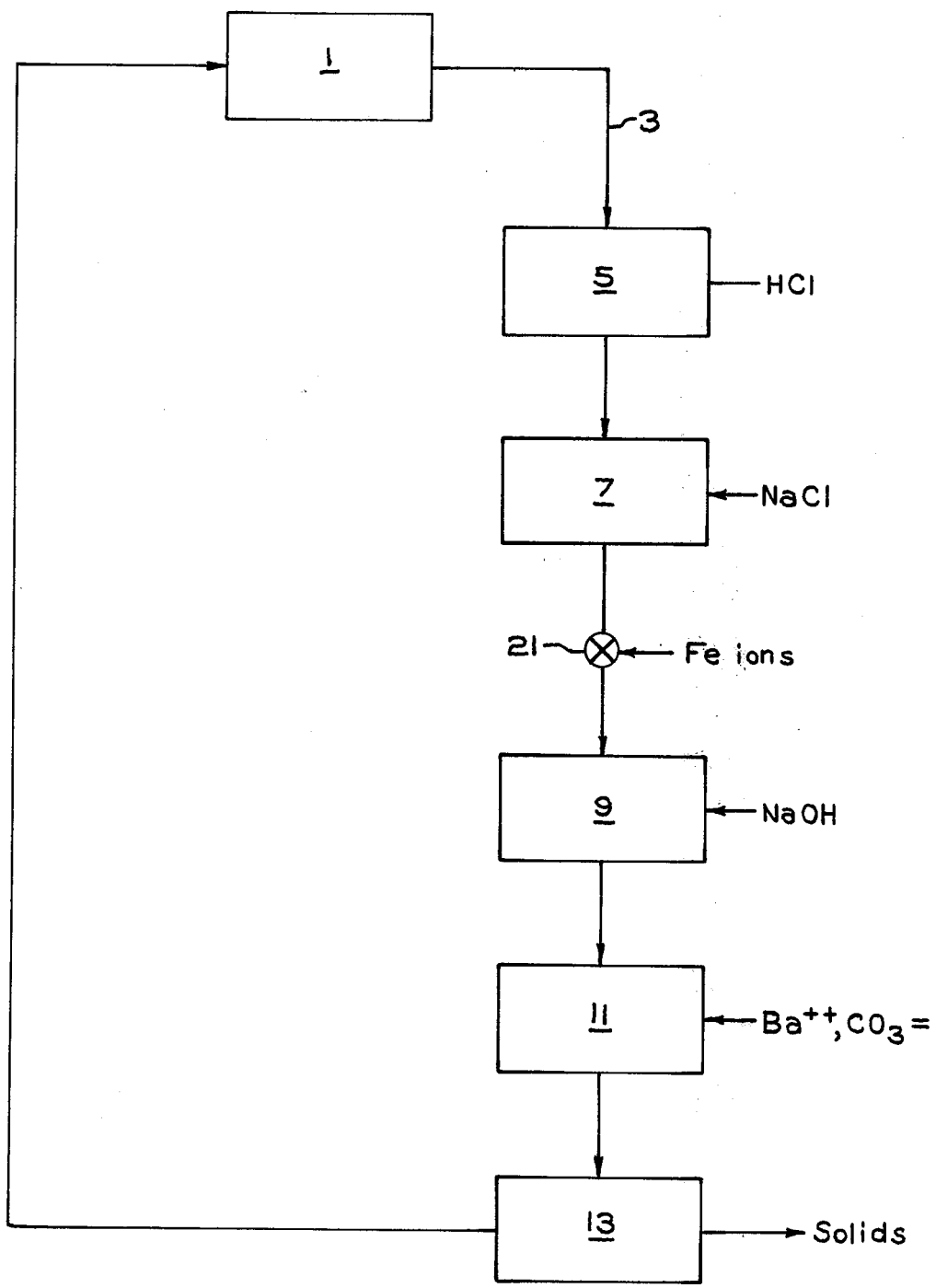

REMOVAL OF HEAVY METALS FROM BRINE

This is a continuation of application Ser. No. 829,410, filed Aug. 31, 1977.

DESCRIPTION OF THE INVENTION

Caustic soda and chlorine may be produced by the electrolytic decomposition of sodium chloride salt in a two-step mercury cell process. This reaction may be carried out in a mercury cell, i.e., a flowing mercury amalgam cathode electrolytic cell or in a variant of a diaphragm cell, e.g., an asbestos diaphragm cell, a microporous diaphragm cell, or a permionic membrane cell.

The mercury cell is characterized by a flowing mercury amalgam cathode with an anode spaced from about $\frac{1}{8}$ to about $\frac{1}{4}$ inch above the mercury cathode and a film of aqueous sodium chloride brine flowing between the mercury cathode and the anode. Chlorine gas is evolved at the anode according to the reaction:

$$Cl^- \rightarrow \tfrac{1}{2} Cl_2 + e^-$$

and alkali metal, typically sodium or potassium, is deposited at the surface of the flowing mercury amalgam cathode in which it dissolves to form a mercury-alkali metal amalgam according to the reaction:

$$Na^+ + (Hg) + e^- \rightarrow Na(Hg).$$

The mercury-alkali metal amalgam is withdrawn from the electrolytic cell and fed to a denuder, also known as a decomposer, where the amalgam is decomposed by the action of water in the internally shorted decomposer, yielding alkali metal hydroxide and hydrogen gas. The reaction at the anode of the denuder is:

$$Na(Hg) \rightarrow Na^+ + (Hg) + e^-$$

and at the cathode thereof is:

$$H_2O + e^- \rightarrow OH^- + \tfrac{1}{2} H_2.$$

The depleted brine is recovered from the flowing mercury amalgam cathode electrolytic cell and is first dechlorinated. Dechlorination of depleted brine is by acidification, typically with hydrochloric acid. The acid reacts with the hypochlorous acid present therein and evolves chlorine. Thereafter, the depleted brine may be treated in various ways to remove further molecular chlorine therefrom, for example, by blowing compressed air through the depleted brine in a column or treating the brine with sulfuric acid.

Normally, the depleted brine, dechlorinated and having a pH of above about 7 and typically containing about 200 to about 280 grams per liter of sodium chloride, is refortified and may be brought to saturation by passing it through a bed of solid salt in dissolving tanks. Refortification of the brine by dissolving salt therein is a source of impurities such as calcium ion, sulfate ion, and heavy metals, e.g., iron, chromium, nickel, manganese, and vanadium. The resaturated brine, i.e., fortified brine, is then purified to remove calcium, magnesium, iron, and sulfate ion. Brine purification is typically effected by adding barium carbonate to remove the sulfate ion, sodium carbonate and sodium bicarbonate to remove calcium ion, and sodium hydroxide to remove the excess sulfate ion.

Normal brine purification functions adequately to remove calcium and magnesium, as well as sulfite ion. However, heavy metal impurities are also present. For example, solid sodium chloride frequently contains iron, chromium, nickel, manganese, and vanadium. These impurities may cause hydrogen to be evolved in the cell.

Similar heavy metal impurity problems are encountered in the permionic membrane cell process.

In the permionic membrane cell process, the electrolytic cell is divided into an anolyte compartment and a catholyte compartment by a permionic membrane. By a permionic membrane is meant a substantially fluid impermeable barrier that selectively allows the passage of cations, e.g., sodium ion and potassium ion, therethrough, while being substantially impermeable to the passage of anions, e.g., chloride ion, therethrough. That is, the permionic membrane is cation selective. The preferred permionic membrane materials are films formed from stable hydrated ion-exchange resins which are fluorinated copolymers having pendant sulfonic acid groups and contain a copolymer having recurring structural units of the formula:

$$\begin{array}{c} F \\ | \\ -C-CF_2- \\ | \\ (R)_n \\ | \\ SO_3H \end{array} \qquad (1)$$

and $$-CXX'-CF_2- \qquad (2)$$

wherein R represents the group $$\begin{array}{c} R' \\ | \\ -CF-CF_2-O(\!\!-\!CF-Y-CF_2O\!\!-\!)_m \end{array}$$

in which:
R' is fluorine or perfluoroalkyl of 1 to 10 carbon atoms;
Y is fluorine or trifluoromethyl and m is 1, 2, or 3, n is 0 or 1;
x is fluorine, chlorine, hydrogen or trifluoromethyl; and
X' is X or $CH_3-(\!-CF_2-\!)_z-$ wherein z is 0 or an integer from 1 to 5; the units of formula (1) being present in an amount from 3 to 20 mole percent.

Additionally, the polymer may be a terpolymer having additional recurring units with pendant carboxylic acid groups thereon. According to a still further exemplification, the sulfonic acid groups may be reacted, e.g., to form sulfonamide groups.

The permionic membrane divides the cell into an anolyte compartment containing anolyte liquor and a catholyte compartment containing catholyte liquor. In the permionic membrane cell process, brine, e.g., saturated brine, is fed to the anolyte chamber. An electrical current is passed from the anode to the cathode and chlorine is evolved at the anode according to the reaction:

$$Cl^- \rightarrow \tfrac{1}{2} Cl_2 + e^-$$

thereby depleting the brine. The cation, e.g., potassium or sodium, passes through the permionic membrane to the catholyte chamber. Hydrogen and hydroxyl ion are formed in the catholyte chamber according to the overall cathodic reaction:

$$H_2O + e^- \rightarrow \tfrac{1}{2} H_2 + OH^-.$$

The anolyte liquor is a depleted brine containing from about 140 to about 250 grams per liter of alkali metal chloride, depending to cell operating parameters. In a preferred method of operating permionic membrane cells, the depleted brine anolyte liquor is withdrawn from the anolyte chamber for dechlorination and refortification. Dechlorination of depleted permionic membrane cell brine is by acidification, e.g., with hydrochloric acid. The acid reacts with the hypochlorous acid present therein, formed by the reaction of chlorine and alkali metal chloride, to form molecular chlorine. Thereafter, the depleted brine may be treated to remove any residual chlorine.

The depleted brine, dechlorinated and having an alkaline pH, is refortified, e.g., to saturation, by passage through a bed of solid salt in dissolving tanks. Refortification of depleted permionic membrane cell anolyte liquor by dissolving salt therein introduces impurities into the refortified brine, e.g., calcium ion, sulfate ion, and heavy metal impurities such as iron, chromium, nickel, manganese, and vanadium, among others. The refortified brine is conventionally purified to remove the calcium and sulfate, the calcium being precipitated by reaction with a carbonate such as sodium carbonate or sodium bicarbonate, and the sulfite being precipitated by reaction with barium.

However, the heavy metal impurities are not removed by the above process. These heavy metal impurities, which can be tolerated in an electrolytic cell having a prior art asbestos diaphragm, reduce the electrolytic efficiency of the permionic membrane cell and increase the voltage drop across the permionic membrane.

According to the method of this invention, the heavy metal impurities are removed from the brine by adding a flocculent such as iron to the depleted brine, fortifying the brine while increasing its pH into the basic range, and thereafter adjusting the pH of the brine to approximately pH 7 in order to flocculate the vanadium. According to a preferred exemplification, the pH is first reduced to the strongly acid region, e.g., a pH of 1.5 to 4.5, and then adjusted to pH 7 to flocculate the vanadium.

DETAILED DESCRIPTION OF THE INVENTION

The method of this invention may be understood by reference to the FIGURE appended hereto. The FIGURE shows a flow chart for the process. A brine line 3 containing depleted brine goes from the cell 1 to a dechlorinator 5 where hydrochloric acid is added to the depleted brine in order to remove the chlorine therefrom. The dechlorinated, depleted brine then passes to a dissolver or resaturator 7 where solid salt refortifies the brine, e.g., to a level of 315 to about 325 grams per liter sodium chloride. This refortified brine then passes from the dissolver or resaturator 7 to a neutralizer 9 where sodium hydroxide addition occurs. The neutralized brine, having a pH of from about 7 to about 10 next goes to a precipitator where barium ions, typically in the form of barium carbonate, carbonate ion, typically in the form of sodium carbonate, and sodium bicarbonate are added to precipitate the calcium ion and sulfate ion. In the case of a flowing mercury amalgam electrolytic cell, sulfide ion, normally in the form of sodium sulfide, is added to precipitate mercury.

The resulting slurry is then passed from the precipitator 11 to filter 13 where it is separated into a solid portion 15 and a liquid portion 17. The liquid portion 17 is a resaturated, dechlorinated brine reduced in calcium content, sulfate content, and heavy metal content. The brine so treated is typically recirculated to the electrolytic cell 1.

According to the method of this invention, iron ion, typically iron chloride, is added at 21 and hydrochloric acid is subsequently added, whereby to maintain the pH of the brine at approximately pH 7, after the brine is refortified in the dissolver or resaturator 7.

According to the method of this invention of operating an electrolytic cell, fortified sodium chloride brine containing from about 300 to about 325 grams per liter of sodium chloride is fed to an electrolytic cell while an electrical current is passed through the cell from an insoluble anode to the cathode. Chlorine and depleted brine are recovered from the electrolytic cell. The brine is diminished in alkali metal chloride content by from about 15 to about 25 percent, that is, to a sodium chloride content of from about 200 to about 250 grams per liter of sodium chloride.

In the mercury cell process, the mercury content of the depleted brine is typically from about 1.5 to about 15 milligrams per liter although it may be as high as 25 or even 50 milligrams per liter depending upon local operating conditions and may, in the event of cell upset, be as high as 200 or more milligrams per liter.

The depleted brine is dechlorinated, refortified in alkali metal chloride content, and purified. The dechlorination typically involves the addition of from about 1.0 to about 8.0 pounds of hydrochloric acid per 1,000 gallons of depleted brine to the chlorinated brine coming out of the cell whereby to remove the solubilized chlorine.

Refortification is accomplished by passing the depleted, dechlorinated sodium chloride brine to a bed of solid salt, dissolving the salt in the depleted brine whereby to fortify the brine up to approximately its saturation content of sodium chloride.

The problem encountered arises in that the solid sodium chloride salt may contain an excessive amount of heavy metal, for example, in excess of 1 part per million vanadium and frequently as high as 1,000 parts per million of vanadium, in excess of 0.1 part per million of iron, in excess of 0.1 part per million of copper, in excess of 0.1 part per million of nickel, in excess of 1 part per million of lead, in excess of 1 part per million of chromium, and in excess of 0.1 part per million of manganese. Vanadium in the brine is particularly deleterious to the mercury cell process in that vanadium promotes hydrogen formation at the amalgam cathode which could result in an explosion in the cell from the reaction of hydrogen and chlorine. Operation with a brine containing in excess of 0.1 milligrams per liter of vanadium requires substantial brine purge and significantly reduced cell efficiency.

Heavy metal impurities are believed to be especially deleterious in the operation of permionic membrane cells. The presence of such heavy metal impurities, even at fractional part per million levels, is believed to result in decreased electrolytic efficiency and increased membrane voltage drop after extended periods of electrolysis.

According to the method of this invention, a ferrous salt is added to the acidified, dechlorinated brine, the pH is adjusted to 7, and the brine is filtered in order to recover the resulting ferric hydroxide precipitate which carries with it the heavy metals.

Typically, the amount of iron added is about 1 to about 10 grams of iron per gram of heavy metal impurities. Typical amounts are on the order of from about 0.1 to about 0.4 pound of iron chloride, $FeCl_2$, per thousand gallons of brine. Other iron salts, such as iron sulfate, may be used. However, iron chloride is preferred in order to minimize the amount of sulfate that must ultimately be removed.

The pH at time of flocculation is typically from about 6 to about 8, and preferably from about 6.5 to about 7.5. Essentially no heavy metal removal occurs at pH's of above about 8, for example, from about 8 to about 10. However, pH 6 to 10 constitutes the range of normal brine purification operations.

While satisfactory metal removal, e.g., down to 0.01 milligram per liter, may be obtained by merely lowering the pH of the refortified brine from an original value above about 8 down to 7, even better metal removal is obtained if the pH is first lowered into the strongly acidic zone and then increased to neutral values. Particularly outstanding results are obtained when the pH of the refortified brine is adjusted to about pH 1.5 to about 4.5 and preferably about pH 2, and thereafter adjusted from 2 to about 6 to 8 and preferably about 7. While the mechanism of heavy metal impurity flocculation by the reduction of pH to the sharply acidic zone and its subsequent increase to approximately neutral pH is not particularly understood, it is believed that $Fe(OH)_3$ is formed and that the $Fe(OH)_3$ is a particularly effective metal scavenger or absorbant. In this way, a refortified, purified brine containing less than 1 part per million of heavy metals may be recovered.

According to a preferred exemplification of this invention, the iron salt is added to the depleted, dechlorinated brine prior to refortification and calcium ion and sulfate ion removal. Thereafter, the brine is maintained at an alkaline pH through refortification and precipitation of the calcium and sulfate, and then the brine is acidified to a pH of about 1.5 to 4.5 and thereafter to a pH of about 6 to 8.

The following example is illustrative.

EXAMPLE

A series of tests were conducted to determine the effect of pH on the removal of vanadium using iron.

A three liter sample of brine was prepared. The brine contained:

| NaCl | 295.4 | gm/liter |
|---|---|---|
| CaO | 2.3 | mg/liter |
| MgO | 0.9 | mg/liter |
| $SiO_2$ | 8.0 | mg/liter |
| $Al_2O_3$ | 2.4 | mg/liter |
| Mn | 1.0 | mg/liter |
| Pb | 0.6 | mg/liter |
| V | 0.30 | mg/liter |
| Fe | 0.6 | mg/liter |
| $Cr^{+6}$ | 0.03 | mg/liter |
| Total Cr | 0.07 | mg/liter |
| Ni | 0.11 | mg/liter |
| Sn, Br, Zr, Ti, W | Traces | |

Two hundred fifty (250) milliliters of water was added to the brine in order to simulate the sodium chloride concentration of dilute effluent brine from a mercury cell. The resulting dilute brine had a sodium chloride content of 275 grams per liter and a vanadium content of 0.240 milligrams per liter.

Three samples of 800 milliliters each were then taken. Each sample was heated to 75°–78° C. and its pH adjusted to pH 3 by the addition of HCl. Twenty (20) milliliters of a 5 gram per liter solution of $FeSO_4.7H_2O$ was added to each sample and the pH was then adjusted to pH 7.5 by the addition of aqueous sodium hydroxide.

One hundred (100) grams of solid sodium chloride, containing:

| Fe | $6 \times 10^{-5}$ weight percent |
|---|---|
| Cu | $3 \times 10^{-5}$ weight percent |
| Ni | $5 \times 10^{-5}$ weight percent |
| Pb | $10 \times 10^{-5}$ weight percent |
| Cr | $1 \times 10^{-5}$ weight percent |
| V | $60 \times 10^{-5}$ weight percent | was added to each sample. Each sample was stirred and maintained at 50° C. for 15 minutes. At this point, the pH of each samle was pH 8.0.

The pH of the first sample was adjusted to pH 7 by the addition of hydrochloric acid. The sample was then allowed to settle for 20 minutes and was thereafter filtered. The resulting filtrate had the following analysis:

| V | < 0.01 | mg/liter |
|---|---|---|
| Cr | < 0.005 | mg/liter |
| Ni | 0.02 | mg/liter |
| Mn | 0.005 | mg/liter |
| Fe | 0.03 | mg/liter |

No adjustment was necessary for the second sample, which had a pH 8. The sample was filtrate and a filtrate containing 0.02 milligrams per liter of vanadium was obtained.

The pH of the third sample was adjusted to pH 9.0 by the addition of NaOH. The sample was allowed to settle for 20 minutes and was then filtered. The filtrate contained 0.06 milligrams per liter of vanadium.

While the invention has been described with reference to specific exemplifications and embodiments thereof, the invention is not to be so limited except as in the claims appended hereto.

I claim:

1. In a method of fortifying alkali metal chloride brine comprising the steps of contacting the brine with alkali metal chloride salt having heavy metal impurities therein whereby to fortify the brine, adding sodium carbonate and barium carbonate to the fortified brine whereby to precipitate calcium and sulfate ions therefrom, and separating the precipitate from the fortified alkaline brine whereby to obtain a fortified, purified, alkaline, brine the improvement comprising adding F++ ion to the brine prior to its fortification, adding acid to the alkaline brine after fortification whereby to lower the pH of the brine to from about 1.5 to 4.5, and thereafter adding $OH^-$ ion to the acidified brine to increase the pH thereof to about 7.0 whereby to flocculate heavy metal impurities therefrom.

2. The method of claim 1 wherein said salt contains in excess of 1 part per million of heavy metal impurities.

3. The method of claim 2 wherein said fortified, purified brine contains less than 1 part per million of heavy metal impurities.

4. The method of claim 1 comprising adding from about 1 to about 10 grams of $Fe^{++}$ per gram of heavy metal impurity.

5. The method of claim 4 comprising adding $Fe^{++}$ to the brine prior to fortification, adding acid to the brine after fortification whereby to lower its pH to from about 1.5 to 4.5, and thereafter adding $OH^-$ ion to increase the pH thereof to from about 6 to about 8.

6. In a method of electrolyzing alkali metal chloride brine comprising the steps of feeding fortified brine to an electrolytic cell, passing an electrical current through the cell, withdrawing depleted brine, adding hydrochloric acid to the depleted brine whereby to dechlorinate the depleted brine, contacting the dechlorinated depleted brine with alkali metal chloride salt having heavy metal impurities therein whereby to refortify the brine, adding sodium carbonate and barium carbonate to the refortified brine whereby to precipitate calcium and sulfate ions therefrom, and separating the precipitate from the refortified brine whereby to obtain a refortified alkaline, purified brine, the improvement comprising adding $Fe^{++}$ ion to the dechlorinated depleted brine prior to its refortification, adding acid to the alkaline brine after refortification whereby to lower the pH of the brine to from about 1.5 to 4.5, and thereafter adding $OH^-$ ion to the acidified brine to increase the pH thereof to about 7.0 whereby to flocculate heavy metal impurities therefrom.

7. The method of claim 6 comprising adding from about 1 to about 10 grams of $Fe^{++}$ per gram of heavy metal impurity.

8. The method of claim 7 comprising adding $Fe^{++}$ to the depleted brine, adding acid to the brine after refortification whereby to lower its pH to from about 1.5 to 4.5, and thereafter adding $OH^-$ ion to increase the pH thereof to from about 6 to about 8.

9. The method of claim 6 wherein said salt contains in excess of 1 part per million of heavy metal impurities.

10. The method of claim 9 wherein said refortified, repurified brine contains less than 1 part per million of heavy metal impurities.

11. The method of claim 6 wherein the electrolytic cell is a flowing mercury amalgam cathode electrolytic cell.

12. The method of claim 6 wherein the electrolytic cell is a permionic membrane cell.

* * * * *